United States Patent
Burns et al.

(10) Patent No.: US 12,314,380 B2
(45) Date of Patent: May 27, 2025

(54) SCANNING AND DETECTING THREATS IN MACHINE LEARNING MODELS

(71) Applicant: HiddenLayer, Inc., Austin, TX (US)

(72) Inventors: Tanner Burns, Austin, TX (US); Chris Sestito, Austin, TX (US); James Ballard, Fredricksburg, VA (US); Thomas Bonner, Steeple Claydon (GB); Marta Janus, Twickenham (GB); Eoin Wickens, Skibbereen (IE)

(73) Assignee: HiddenLayer, Inc., Austin, TX (US)

( * ) Notice: Subject to any disclaimer, the term of this patent is extended or adjusted under 35 U.S.C. 154(b) by 280 days.

(21) Appl. No.: 18/113,444

(22) Filed: Feb. 23, 2023

(65) Prior Publication Data

US 2024/0289436 A1    Aug. 29, 2024

(51) Int. Cl.
*G06F 21/53* (2013.01)
*G06F 21/56* (2013.01)

(52) U.S. Cl.
CPC .............. *G06F 21/53* (2013.01); *G06F 21/56* (2013.01)

(58) Field of Classification Search
CPC ........ G06F 21/53; G06F 21/56; G06F 21/562; G06F 21/566; G06F 21/577; G06N 3/04; H04L 63/1433
See application file for complete search history.

(56) References Cited

U.S. PATENT DOCUMENTS

| | | |
|---|---|---|
| 7,802,298 B1 | 9/2010 | Hong et al. |
| 9,356,941 B1 | 5/2016 | Kislyuk et al. |
| 9,516,053 B1 | 12/2016 | Muddu et al. |
| 10,193,902 B1 | 1/2019 | Caspi et al. |
| 10,210,036 B2 | 2/2019 | Iyer et al. |
| 10,462,168 B2 | 10/2019 | Shibahara et al. |
| 10,637,884 B2 | 4/2020 | Apple et al. |
| 10,673,880 B1 | 6/2020 | Pratt et al. |
| 10,764,313 B1 | 9/2020 | Mushtaq |
| 10,803,188 B1 | 10/2020 | Rajput et al. |
| 11,310,270 B1 | 4/2022 | Weber et al. |
| 11,483,327 B2 | 10/2022 | Hen et al. |
| 11,501,101 B1 | 11/2022 | Ganesan et al. |
| 11,551,137 B1 | 1/2023 | Echauz et al. |
| 11,601,468 B2 | 3/2023 | Angel et al. |
| 11,710,067 B2 | 7/2023 | Harris et al. |

(Continued)

OTHER PUBLICATIONS

Morozov et al., 2019, "Unsupervised Neural Quantization for Compressed-Domain Similarity Search," International Conference on Computer Vision (ICCV) 2019 (11 pages).

(Continued)

*Primary Examiner* — Lynn D Feild
*Assistant Examiner* — Vladimir I Gavrilenko
(74) *Attorney, Agent, or Firm* — Jones Day

(57) ABSTRACT

A machine learning model is scanned to detect actual or potential threats. The threats can be detected before execution of the machine learning model or during an isolated execution environment. The threat detection may include performing a machine learning file format check, vulnerability check, tamper check, and stenography check. The machine learning model may also be monitored in an isolated environment during an execution or runtime session. After performing a scan, the system can generate a signature based on actual, potential, or absence of detected threats.

21 Claims, 8 Drawing Sheets

(56) References Cited

U.S. PATENT DOCUMENTS

| | | |
|---|---|---|
| 11,762,998 B2 | 9/2023 | Kuta et al. |
| 11,777,957 B2 | 10/2023 | Chen et al. |
| 11,875,130 B1 | 1/2024 | Bosnjakovic et al. |
| 11,893,111 B2 | 2/2024 | Sai et al. |
| 11,893,358 B1 | 2/2024 | Lakshmikanthan et al. |
| 11,930,039 B1 | 3/2024 | Geethakumar et al. |
| 11,960,514 B1 | 4/2024 | Taylert et al. |
| 11,962,546 B1 | 4/2024 | Hattangady et al. |
| 11,971,914 B1 | 4/2024 | Watson et al. |
| 11,972,333 B1 | 4/2024 | Horesh et al. |
| 11,997,059 B1 | 5/2024 | Su et al. |
| 12,124,592 B1 | 10/2024 | O'Hern et al. |
| 12,182,264 B2 * | 12/2024 | Sinha ................ G06F 11/1464 |
| 2010/0082811 A1 | 4/2010 | Van Der Merwe |
| 2014/0033307 A1 | 1/2014 | Schmidtler |
| 2014/0157415 A1 | 6/2014 | Abercrombie et al. |
| 2015/0074392 A1 | 3/2015 | Boivie et al. |
| 2016/0344770 A1 | 11/2016 | Verma et al. |
| 2017/0154021 A1 | 6/2017 | Vidhani et al. |
| 2017/0251006 A1 | 8/2017 | LaRosa et al. |
| 2017/0331841 A1 | 11/2017 | Hu et al. |
| 2018/0018590 A1 | 1/2018 | Szeto et al. |
| 2018/0063190 A1 | 3/2018 | Wright et al. |
| 2018/0205734 A1 | 7/2018 | Wing et al. |
| 2018/0219888 A1 | 8/2018 | Apostolopoulos |
| 2018/0324193 A1 | 11/2018 | Ronen et al. |
| 2019/0050564 A1 | 2/2019 | Pogorelik et al. |
| 2019/0238572 A1 | 8/2019 | Manadhata et al. |
| 2019/0260784 A1 | 8/2019 | Stockdale et al. |
| 2019/0311118 A1 | 10/2019 | Grafi et al. |
| 2019/0392176 A1 | 12/2019 | Taron et al. |
| 2020/0019721 A1 | 1/2020 | Shanmugam et al. |
| 2020/0076771 A1 | 3/2020 | Maier et al. |
| 2020/0175094 A1 | 6/2020 | Palmer et al. |
| 2020/0219009 A1 | 7/2020 | Dao et al. |
| 2020/0233979 A1 | 7/2020 | Maraghoosh et al. |
| 2020/0285737 A1 | 9/2020 | Kraus et al. |
| 2020/0409323 A1 | 12/2020 | Spalt et al. |
| 2021/0110062 A1 | 4/2021 | Oliner et al. |
| 2021/0141897 A1 | 5/2021 | Seifert et al. |
| 2021/0209464 A1 | 7/2021 | Bala et al. |
| 2021/0224425 A1 | 7/2021 | Nasr-Azadani et al. |
| 2021/0303695 A1 * | 9/2021 | Grosse .................... G06N 3/08 |
| 2021/0319098 A1 | 10/2021 | Pogorelik et al. |
| 2021/0319784 A1 | 10/2021 | Le Roux et al. |
| 2021/0357508 A1 | 11/2021 | Elovici et al. |
| 2021/0374247 A1 | 12/2021 | Sultana et al. |
| 2021/0407051 A1 | 12/2021 | Pardeshi et al. |
| 2022/0030009 A1 | 1/2022 | Hasan |
| 2022/0058444 A1 | 2/2022 | Olabiyi et al. |
| 2022/0070195 A1 | 3/2022 | Sern et al. |
| 2022/0083658 A1 | 3/2022 | Shah et al. |
| 2022/0114399 A1 | 4/2022 | Castiglione et al. |
| 2022/0147597 A1 | 5/2022 | Bhide et al. |
| 2022/0164444 A1 | 5/2022 | Prudkovskij et al. |
| 2022/0166795 A1 | 5/2022 | Simioni et al. |
| 2022/0182410 A1 | 6/2022 | Tupsamudre et al. |
| 2022/0253464 A1 | 8/2022 | Sloane et al. |
| 2022/0269796 A1 | 8/2022 | Chase et al. |
| 2022/0309179 A1 | 9/2022 | Payne et al. |
| 2023/0008037 A1 | 1/2023 | Venugopal et al. |
| 2023/0027149 A1 | 1/2023 | Kuan et al. |
| 2023/0049479 A1 | 2/2023 | Mozo Velasco et al. |
| 2023/0109426 A1 | 4/2023 | Hashimoto et al. |
| 2023/0128947 A1 * | 4/2023 | Bhaskar ............... G06N 3/0464 701/26 |
| 2023/0148116 A1 | 5/2023 | Stokes et al. |
| 2023/0169397 A1 | 6/2023 | Smith et al. |
| 2023/0185912 A1 | 6/2023 | Sinn et al. |
| 2023/0185915 A1 | 6/2023 | Rao et al. |
| 2023/0208869 A1 | 6/2023 | Bisht et al. |
| 2023/0229960 A1 | 7/2023 | Zhu et al. |
| 2023/0252178 A1 | 8/2023 | Ruelke et al. |
| 2023/0259787 A1 | 8/2023 | David et al. |
| 2023/0269263 A1 | 8/2023 | Yarabolu |
| 2023/0274003 A1 | 8/2023 | Liu et al. |
| 2023/0289604 A1 | 9/2023 | Chan et al. |
| 2023/0351143 A1 | 11/2023 | Kutt et al. |
| 2023/0359903 A1 | 11/2023 | Cefalu et al. |
| 2023/0359924 A1 * | 11/2023 | Maman .................... G06F 9/543 |
| 2023/0385085 A1 | 11/2023 | Singh |
| 2023/0388324 A1 | 11/2023 | Thompson |
| 2024/0022585 A1 | 1/2024 | Burns et al. |
| 2024/0039948 A1 | 2/2024 | Koc et al. |
| 2024/0045959 A1 | 2/2024 | Marson et al. |
| 2024/0078337 A1 | 3/2024 | Kamyshenko et al. |
| 2024/0080333 A1 | 3/2024 | Burns et al. |
| 2024/0126611 A1 | 4/2024 | Phanishayee et al. |
| 2024/0160902 A1 | 5/2024 | Padgett et al. |
| 2024/0289628 A1 | 8/2024 | Parmar et al. |
| 2024/0296315 A1 | 9/2024 | Singh et al. |
| 2024/0386103 A1 | 11/2024 | Clement et al. |

OTHER PUBLICATIONS

Rijthoven et al., 2021, "HookNet: Multi-resolution convulational neural networks for semantic segmentation in histopathology whole-slide images," Medical Imange Analysis 68:1-10.

* cited by examiner

SCANNING AND DETECTING THREATS IN MACHINE LEARNING MODELS

BACKGROUND

Machine learning computing resources are becoming more popular in products and computing systems. With the increased presence of machine learning model resources, so have the attacks perpetrated on machine learning-based systems by bad actors. Usually, threats to machine learning models are not discovered until the threat materializes and damage is done to the model or the system in which it operates. As such, what is needed is an improved method for detecting threats on machine learning systems.

SUMMARY

The present technology, roughly described, scans a machine learning model for threats. The threats can be detected before execution of the machine learning model or during execution in an isolated environment, such as for example a sandbox. The threat detection may include performing a machine learning file format check, vulnerability checks, tamper checks, and/or stenography checks. The machine learning model may also be monitored in an isolated environment during an execution or runtime session.

After performing a scan, the scanning system generates a set of results based on the threat detection operations and identifies any actual or potential threats that exist in the machine learning model. The system can generate a signature based on actual, potential, or lack of detected threats. For example, if no threats are detected, the system may generate a signature and embed the signature within the model data or file format of the machine learning model.

In some instances, the present technology provides a method for scanning a machine learning model for threats. The method begins by receiving data for a machine learning model by a scanning module, where the scanning module is stored on a first server, and the data is associated with model parameters and received before execution of the machine learning model. The method continues with performing a plurality of checks by the scanning module based on the received machine learning model data, wherein the checks are performed while the machine learning model is not executing. Next, the scanning module identifies whether the machine learning model includes a threat within the machine learning model based on one or more results of the plurality of checks. The one or more results are reported to a remote computing device by the scanning module.

In some instances, a non-transitory computer readable storage medium includes embodied thereon a program, the program being executable by a processor to perform a method for scanning a machine learning model for threats. The method begins with scanning a receiving data for a machine learning model by a scanning module, where the scanning module is stored on a first server, and the data is associated with model parameters and received before execution of the machine learning model. The method continues with performing a plurality of checks by the scanning module based on the received machine learning model data, wherein the checks are performed while the machine learning model is not executing. Next, the scanning module identifies whether the machine learning model includes a threat within the machine learning model based on one or more results of the plurality of checks. The one or more results are reported to a remote computing device by the scanning module.

In some instances, a system for scanning a machine learning model for threats includes a server having a memory and a processor. One or more modules can be stored in the memory and executed by the processor to receive data for a machine learning model by a scanning module, the scanning module stored on a first server, the data associated with model parameters and received before execution of the machine learning model, perform a plurality of checks by the scanning module based on the received machine learning model data, the checks performed while the machine learning model is not executing, identify, by the scanning module, whether the machine learning model includes a threat within the machine learning model based on results of the plurality of checks, and report the results to a remote computing device by the scanning module.

DETAILED DESCRIPTION

The present technology, roughly described, scans a machine learning model for actual or potential threats. The threats can be detected before execution of the machine learning model or during execution in an isolated execution environment. The threat detection may include performing a machine learning file format check, vulnerability check, tamper check, and/or stenography check. The machine learning model may also be monitored in an isolated environment during an execution or runtime session.

After performing a scan, the scanning system generates a set of results based on the threat detection operations and identifies any actual or potential threats that exist in the machine learning model. The system can generate a signature based on actual, potential, or lack of detected threats. For example, if no threats are detected, the system may generate a signature and embed the signature within the model data or file format of the machine learning model.

Figure 1:
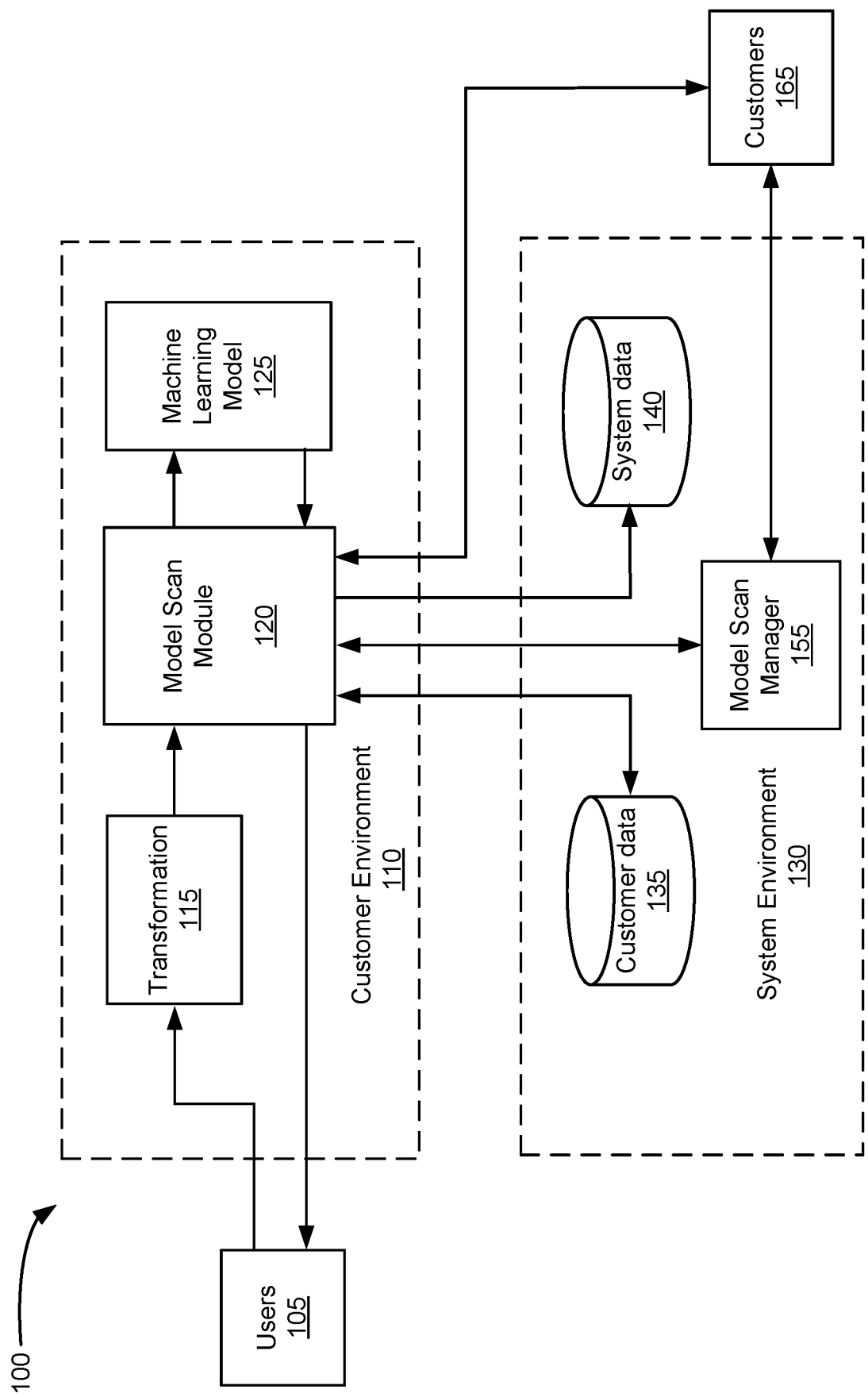
FIG. 1 is a block diagram of a system for scanning a machine learning model.

FIG. 1 is a block diagram of a system for performing a model scan. The block diagram of FIG. 1 includes customer environment 110 and system environment 130. Customer environment 110 includes transformation module 115, model scan module 120, and machine learning model 125. Customer environment 110 may receive and communicate data with one or more users 105, system environment 130, and customers 165. System environment 130 may include customer data 135, system data 140, and model scan manager 155.

The model scan module 120 can scan the machine learning model 125 before the module is used by users 105. When used by users, the users may provide a stream of data, such as timeseries data, generalized input, or some other data type, to transformation module 115. The transformation module may convert the received timeseries into a series of vectorized data. In some instances, the vectorized data may include an array of float numbers. The vectorization of the received data is then provided to machine learning model 125 for processing. After processing the vectorized data, machine learning model will provide an output, such as a prediction, intended for the requesting user 105.

Model scan module 120 may collect the vectorized data provided by transformation 115 as well as the output provided by machine learning model 125. The model scan module 120 may then scan the model input, model output, and aspects of the machine learning model itself. In some instances, the model scan module may perform a file format check, vulnerability check, stenography, detect tampering, and perform runtime scanning of the machine learning model The model scan module 120 may be implemented in several ways. In some instances, a model scan module may be implemented as an API placed between the requesting user and the machine learning model. The API may intercept the request, and then send the request to the machine learning model.

In some instances, the model scan module may be implemented by an API gateway as well as a proxy application. The API gateway may receive the request, provide the request to the proxy application, which may then forward the request to the machine learning model 125.

Returning to FIG. 1, system environment 130 includes customer data store 135, system data store 140, and model scan manager 155, and customers 165. Each of customer environment 110 and system environment 130 may be implemented as one or more servers implementing the physical or logical modules 115-125 and 135-155 illustrated in FIG. 1. In some instances, each environment is located in one or more cloud computing environments.

Environments 110 and 130 may communicate over a network. In some instances, one or more modules may be implemented on separate machines in separate environments which may also communicate over a network. The network may be implemented by one or more networks suitable for communication between electronic devices, including but not limited to a local area network, wide-area networks, private networks, public network, wired network, a wireless network, a Wi-Fi network, an intranet, the Internet, a cellular network, a plain old telephone service, and any combination of these networks.

The customer data store 135 of FIG. 1 includes data associated with one or more customers. The customer data stored includes data for customers of the present system, and may be accessed by any module within system environment 130.

System data 140 includes data related to system environment 130. System data may include event data, traffic data, timestamp data, and other data. The data may be accessed by any of modules 145-160, and may be used to generate one or more dashboards for use by customers 165.

Model scan manager 155 may communicate with model scan module 120 and provide output regarding one or more scanned machine learning modules to customers 165. In some instances, some or all of the functionality described with respect to model scan module 120 may be implemented at least in part by model scan manager 155. For example, model scan manager may provide output in the form of a dashboard regarding the status of one or more scans of one or more machine learning models 125.

Figure 2:
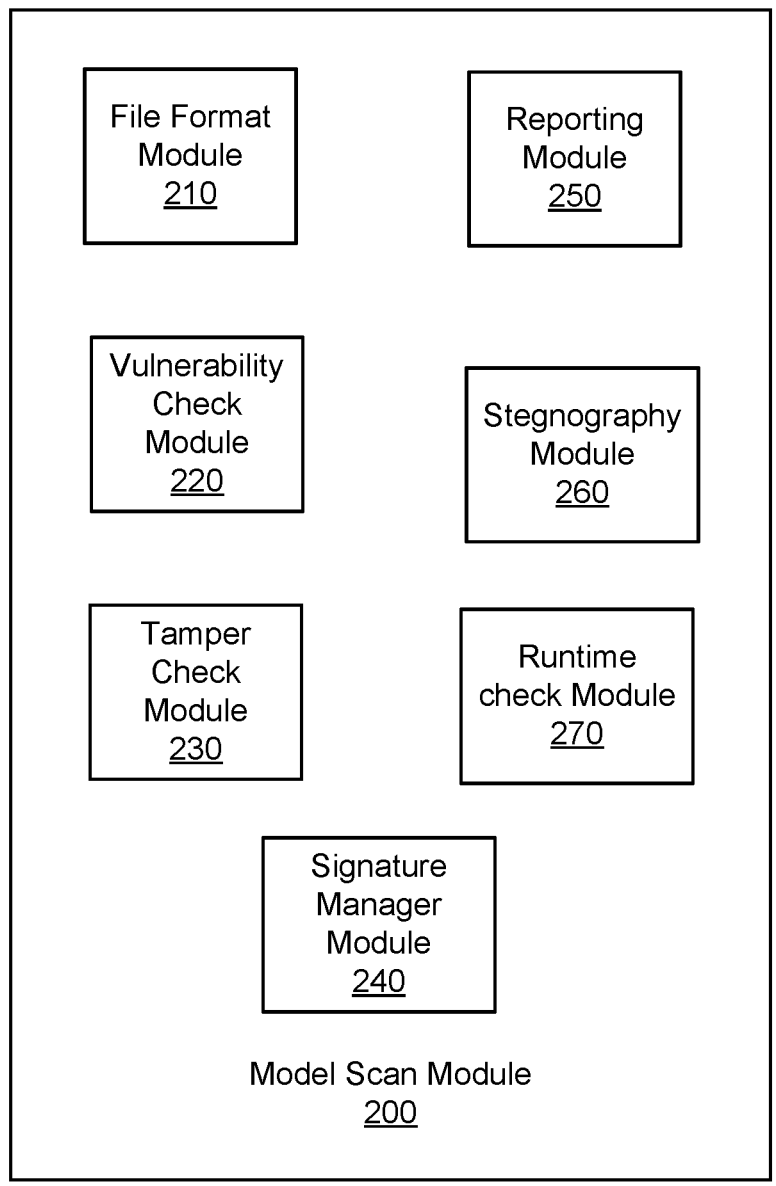
FIG. 2 is a block time of a machine learning model scan module.

FIG. 2 is a block diagram of a model scan module. Model scan module 200 provides more detail for model scan module 125 of FIG. 1. Model scan module 200 includes file format module 210, vulnerability check module 220, temperature module 230, signature manager module 240, reporting module 250, stenography module 260, and runtime check module 270.

File format module 210 may detect and process file formats of a machine learning model. A file format may include model data, such as for example numeric weights and other model data. In some instances, the file format data is a wrapper around model data to convey data, for example in .zip., pickle, protobuf, HDF, or JSON format.

Vulnerability check module 220 may analyze and determine vulnerability of a machine learning module. A vulnerability check may be based on the machine learning model type, layers, changes in relation to a base model topology, or level of dormant activity.

Tamper check module 230 may determine whether a machine learning model has been tampered with. In some instances, detecting tampering of a machine learning model may be based on an analysis of model data such as layers or weights, or on identifying related models.

Reporting module 250 may report scan status and any actual or potential threats identified for a machine learning model. Signature manager module 240 may determine whether a machine learning model includes a previously generated signature. Module 240 may also generate and embed a signature within a machine learning model.

Figure 3:
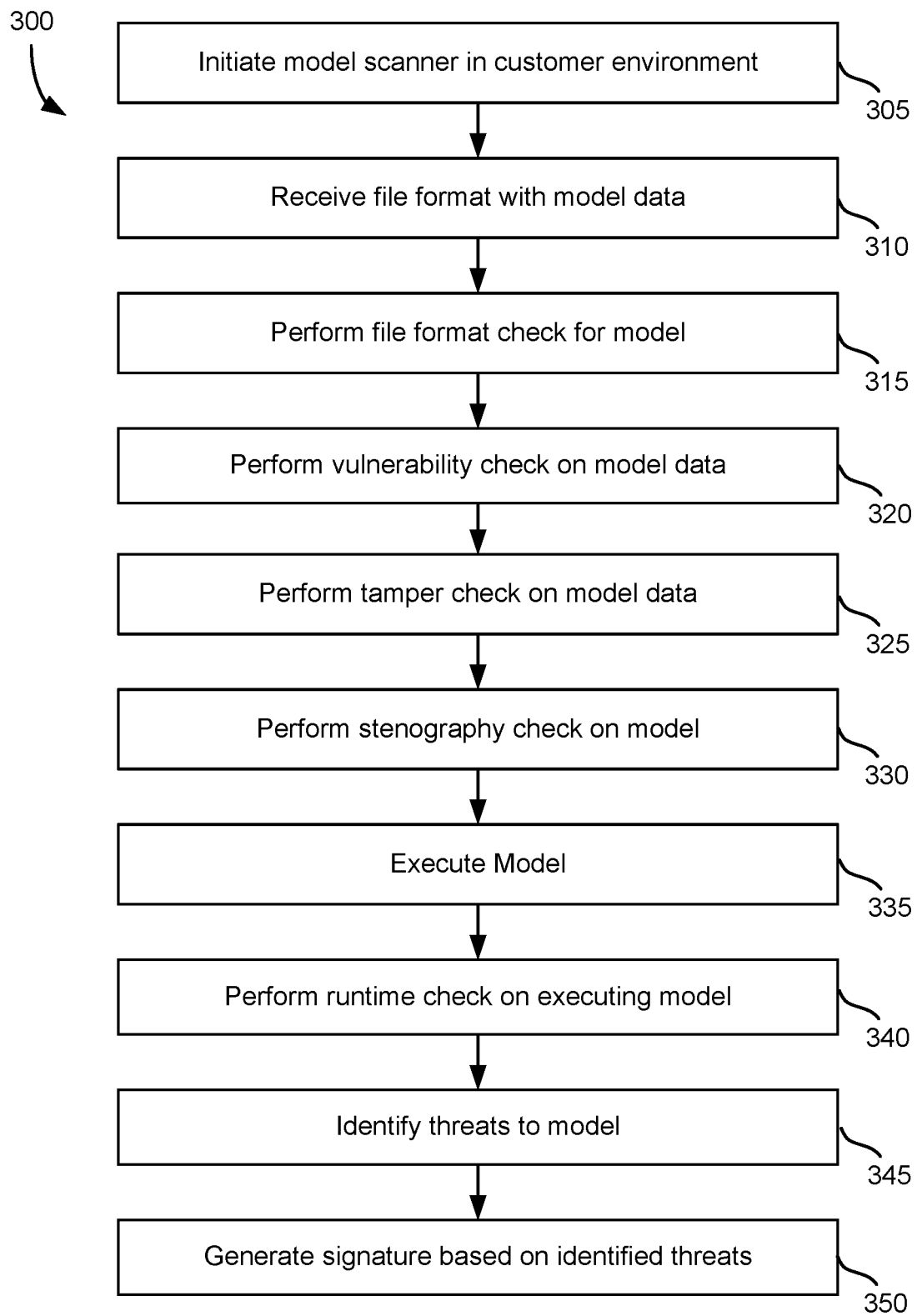
FIG. 3 is a flowchart of a method for scanning a machine learning model.

FIG. 3 is a flowchart of a method for performing a model scan. A model scanner is initiated in a customer environment at step 305. The Model scanner may be installed in a customer environment such that it may access the machine learning model code, inputs and outputs, within the environment. The machine learning model file format may be received by the model scanner at step 310. The file format may include model data, such as machine learning model layer data, weights, and other data. The file format check may be performed for the model at step 315.

A vulnerability check may be performed on the model data at step 320. The vulnerability check may be applied to neural net, random forest, and other machine learning model types. For example, with a neural net machine learning model, there may be parameters that specify its policy, number of players, units per layer, the nature of an interconnect player, and other parameters. The vulnerability check may determine how closely related the scanned model is to a typical base model. For example, most machine learning models are fine-tuned versions of a particular base model. The scanner, in some instances, may determine if the fine-tuned machine learning model has the same topology architecture of the base model. Determining a vulnerability check may include detecting changes to the based apology and parameters, detecting backdoors, and dormant portions and activated upon a certain input. Performing a tamper check may include checking model data layers and specific weights to determine if they may suggest a threat.

A tamper check may also involve identifying related models, such as determining if a current machine learning model is similar to a previous model in which a threat was detected. Performing a tamper check is discussed in more detail below with respect to FIGS. 4 through 6.

A stenography check may be performed on the machine learning model at step 330. A stenography check may analyze the lower order bits and other aspects of the machine learning model data. For example, after processing the file format and compression, the model scanner can obtain actual weights and biases used in the model. The lower order bits in each individual number have little impact in resulting calculations and can be zeroed out through compression. Lower significant bits are typically random. If the scan model extracts the lower bits and, after studying the distribution, determines they are not random, it may be identified as a potential or actual threat based on tampering, depending on the degree of randomness or lack of randomness.

In some instances, performing a stenography check may include analyzing entropy associated with a machine learning model. A baseline may be determined for certain types of models. Clustering can be used to understand model types, baselines, identify predicted entropy, detect the actual entropy system to compare the predicted statistic to the actual entropy statistic to determine if malware is within the model at static runtime.

The machine learning model being scanned may be executed at step 335. During execution, a runtime check may be performed on the executing model at step 340. In some instances, the model may be executed in a sandbox or other isolated environment or virtual machine. While executing, the scanning tool may identify executing shell scripts, and other processes in the isolated environment, where no processes should start by themselves. In some instances, loading the machine learning model in memory could cause malicious code to execute and be identified as a threat.

After performing the various checks and analyses on the machine learning model, model and information and threats to the model are identified at step 345. Information from the scan may include the time of the scan, scan failures and successes, the model file scanned, as was the threats detected. A threat may be a condition or other aspect of a machine learning model that allows the model to be manipulated, controlled, or otherwise affected in an unintended and/or undesired way.

A signature may be generated based on the identified threats, if any, at step 350. Generally, a machine learning model does not include a signature. The scanner tool may generate a signature if no threats are detected and embed the signature within the machine learning model data. In some instances, manipulation of the machine learning model file may invalidate the signature. In some instances, manipulation of any material portion of the machine learning model will invalidate the signature. Hence, if a signature is generated, and the model subsequently modified, it will be detectable using the generated signature.

In some instances, any of the checks in steps 410-430 and 440 may be performed using machine learning models. The machine learning model may receive input in the form of file format data, layer data, or other data discussed with respect to steps 410-430 and 440 for the model being scanned. The machine learning model receiving the data may generate a prediction or other indication as to whether the scanned model likely includes a threat. The output may then be used as part of step 445 to determine whether the scanned model includes a threat. For example, for a prediction value ranging from 0 to 1, a value above 0.6 may indicate a threat, while a value of 0.3 to 0.6 may indicate a potential threat.

Figure 4:
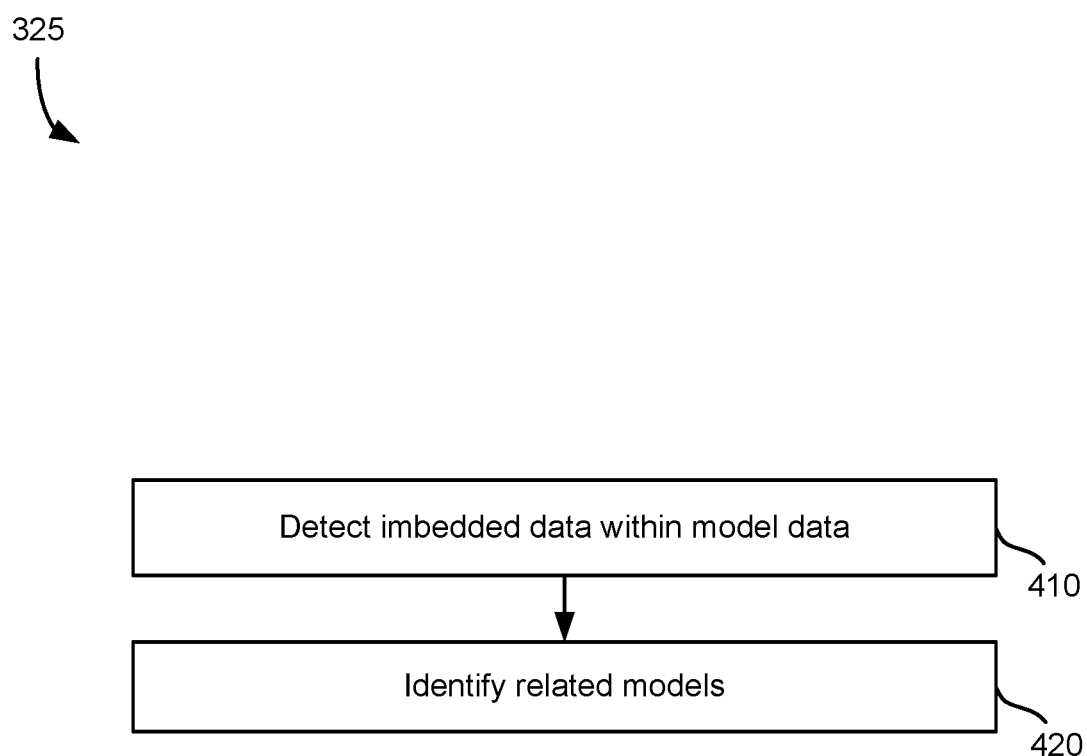
FIG. 4 is a method for performing a tamper check on machine learning model data.

FIG. 4 is a method for performing a tamper check on model data. The method of FIG. 4 provides more data for step 325 of the method of FIG. 3. Embedded data within the model data may be detected at step 410. Detecting embedded data may be based on analysis of neural network layers, neuron interconnections, and model data weights and biases. More detail for detecting embedded data is discussed with respect to the method of FIG. 5.

Related machine learning models may be identified at step 420. Identifying related models may be useful to compare a new model with a previously known infected model or a model detected to have one or more threats. More detail for identifying related models is discussed with respect to the method of FIG. 6.

Figure 5:
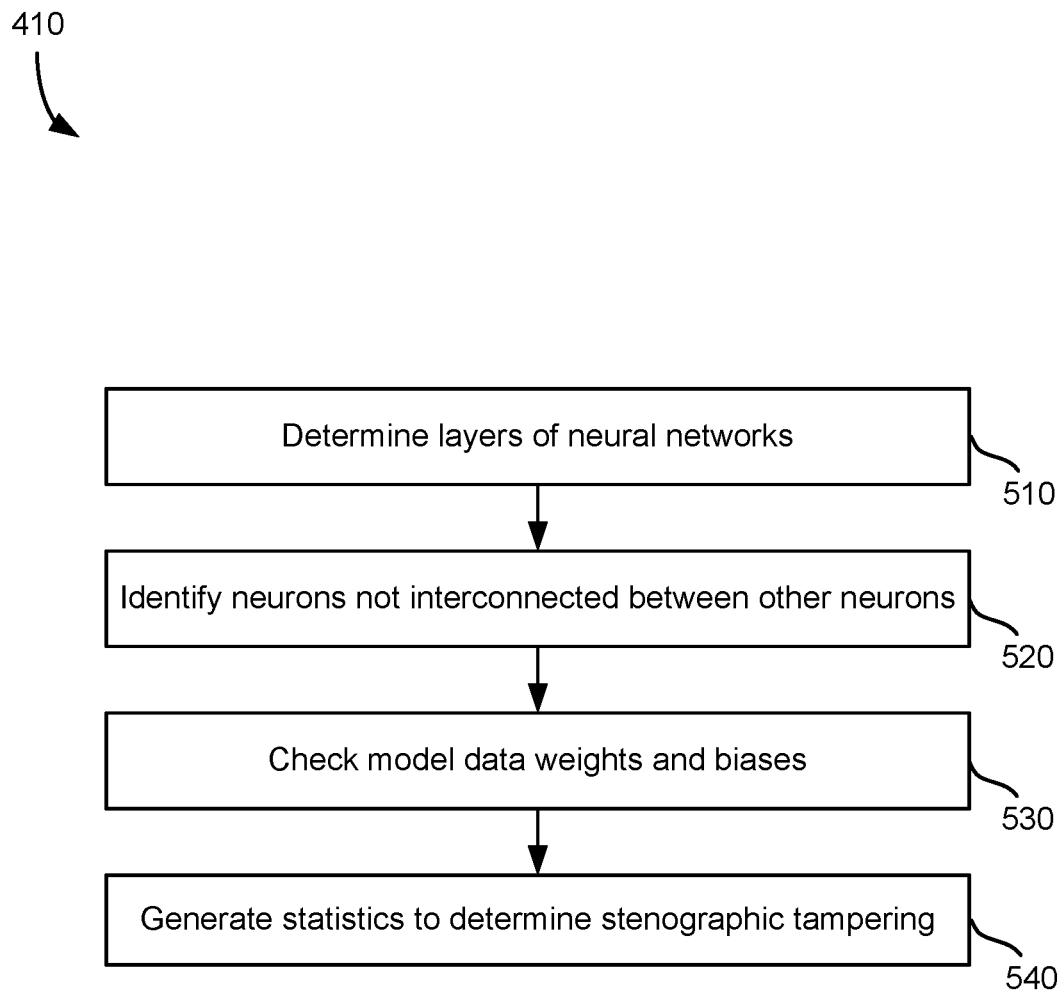
FIG. 5 is a method for detecting embedded data within machine learning model data.

FIG. 5 is a method for detecting embedded data within model data. The method of FIG. 5 provides more detail for step 410 of the method of FIG. 4. First, layers of neural networks may be determined at step 510. Neurons not interconnected with other neurons are identified at step 520. For example, a neuron that is connected to a point completely outside the machine learning model may be identified as a potential threat.

Model data weights and biases may be checked at step 530. Model data weights and biases may be used to generate statistics at step 540. The statistics are generated to determine stenographic tampering. For example, the entropy of a machine learning model may be used to determine whether a model has a threat. To identify a threat based on entropy, a baseline entropy is determined for the machine learning model. The baseline entropy can be determined for certain types of machine learning models. Clustering can then be performed to understand the machine learning model type being used, identify predicted entropy for the particular model, and to detect the actual entropy for the particular machine learning model being scanned. The Scanning module can compare the actual entropy to the predicted entropy to identify if malware is within the model during static runtime.

Figure 6:
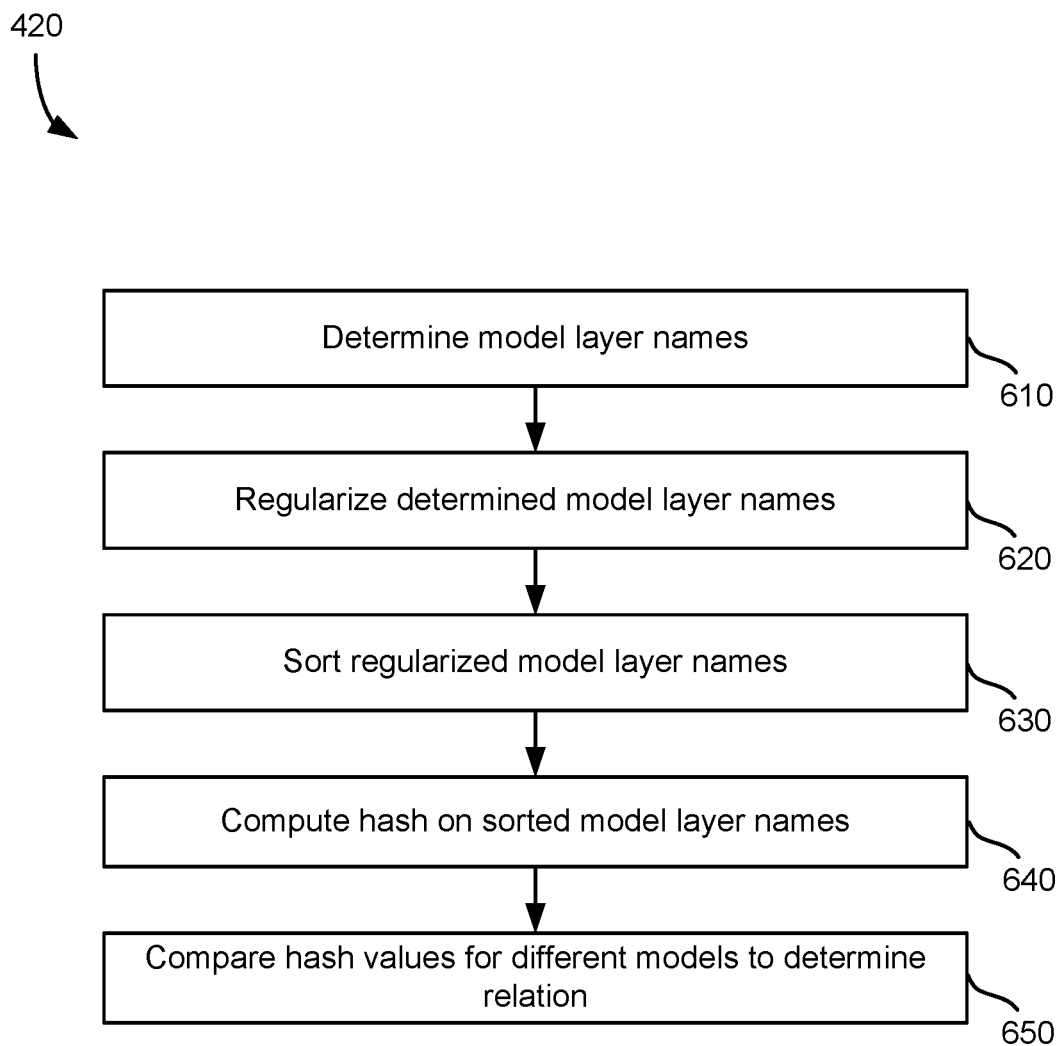
FIG. 6 is a method for identifying related machine learning models.
Figure 7:
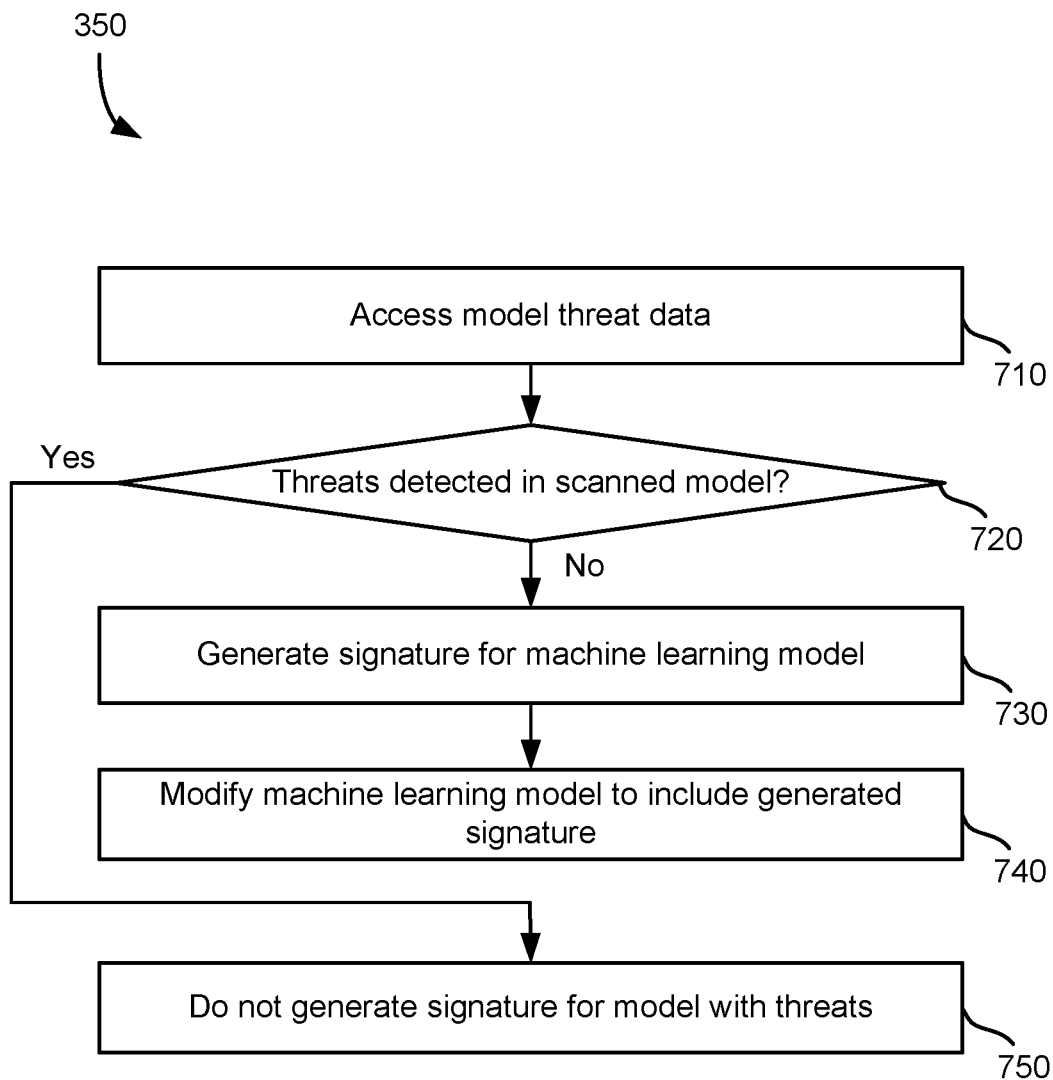
FIG. 7 is a method for generating a signature based on identified threats to a machine learning model.

FIG. 6 is a method for identifying related models. The method of FIG. 6 provides more detail for step 420 of the method of FIG. 4. First, model layer names are determined at step 610. The model layer names may be regularized at step 620. The regularization of the model names may include removing spaces, periods, and making the names in lowercase letters. The regularized model layer names may be sorted at step 630. In some instance, the regularized names are alphabetically sorted. A hash may then be performed on the sorted model layer names at step 640. The hash generated using any hashing technique suitable to generate a comparable value. Hash values for different models may be compared to determine a relationship at step 650. For example, if a present model hash value is similar to the hash value of a machine learning model known to have threats, the present model may be treated as having a similar threat FIG. 7 is a method for generating a signature based on identified threats. The method of FIG. 7 provides more detail for step 350 of the method of FIG. 3. First, model threat data is accessed at step 710. A determination is then made as to whether the data generated based on the machine learning model scan includes any threats indicating that the model has viable threats.

If the threat data indicates that threats do exist in the machine learning model, a signature is not generated for the model at step 750. If the threat data indicates that no threat is associated with the machine learning model, a signature is generated for the machine learning model at step 730. Machine learning models and modified to include the generated teacher at step 740.

Figure 8:
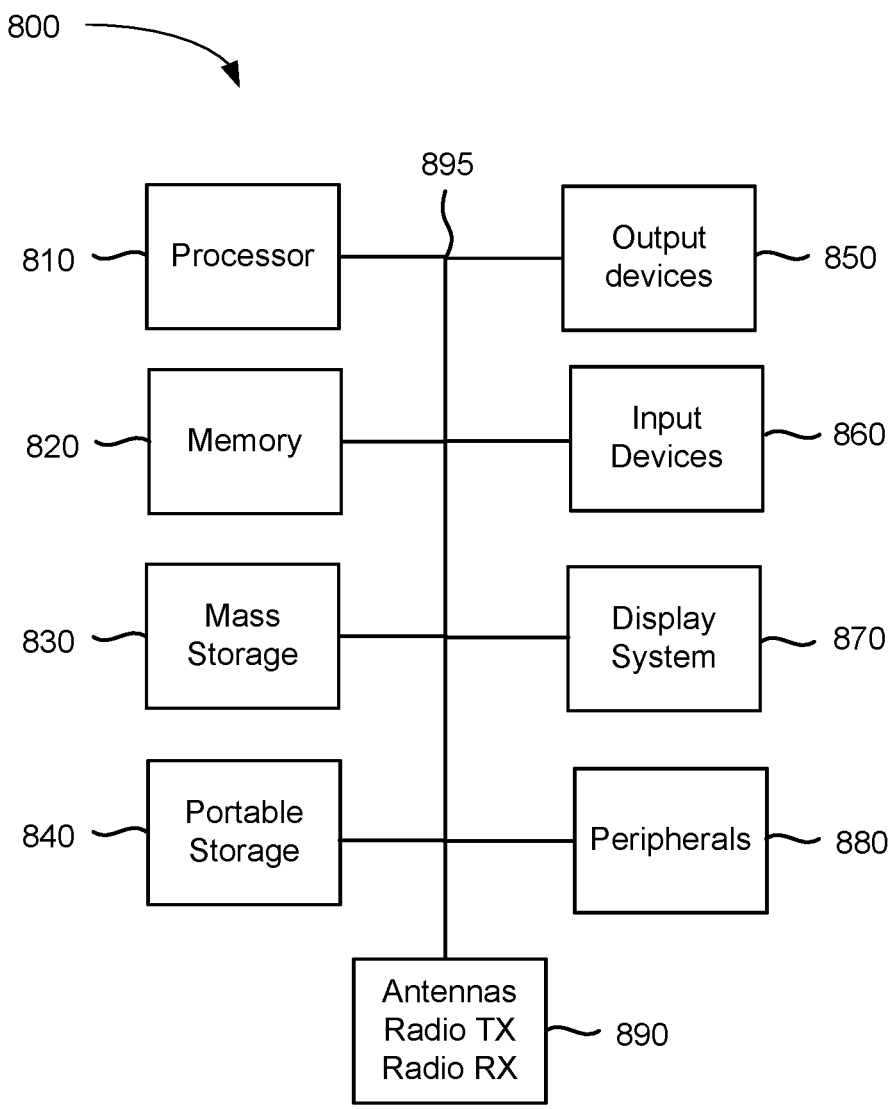
FIG. 8 is a computing environment for implementing the present technology.

FIG. 8 is a block diagram of a computing environment for implementing the present technology. System 800 of FIG. 8 may be implemented in the contexts of the likes of machines that implement model scan module 120, customer data store 135, system data store 140, and model scan manager 155. The computing system 800 of FIG. 8 includes one or more processors 810 and memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive, an optical disk drive, a flash drive, or other device, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a floppy disk, compact disk or Digital video disc, USB drive, memory card or stick, or other portable or removable memory, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information and processes the information for output to the display device. Display system 870 may also receive input as a touch-screen.

Peripherals 880 may include any type of computer support device to add additional functionality to the computer system. For example, peripheral device(s) 880 may include a modem or a router, printer, and other device.

The system of 800 may also include, in some implementations, antennas, radio transmitters and radio receivers 890. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for scanning a machine learning model for threats, comprising:
   receiving, by a scanning module, data for a machine learning model, the scanning module stored on a first server, the data associated with model parameters and received before execution of the machine learning model;
   performing, by the scanning module, a plurality of checks based on the received machine learning model data, the checks performed while the machine learning model is not executing,
   the performing comprising:
   determining weights and biases of the machine learning model;
   determining an expected entropy for the machine learning model based on clustering of known machine learning models guided by calculated entropy;
   determining, based on the weights and biases, an actual entropy for the machine learning model; and
   calculating the difference between the expected entropy and the actual entropy;
   identifying, by the scanning module and based on the calculated difference, whether the machine learning model includes a threat within the machine learning model based on results of the plurality of checks; and
   adding, by the scanning module and based on the identifying, an indicator to the machine learning model characterizing actual, potential or detected threats within the machine learning model.

2. The method of claim 1, further including:
   generating a signature based on determining that the machine learning model does not include a threat; and
   embedding the generated signature within the data for the machine learning model.

3. The method of claim 1, wherein the plurality of checks includes two or more of a file format check, a vulnerability check, a tampering check, and a stenography check.

4. The method of claim 1, further including:
   executing the machine learning model in an isolated environment;
   monitoring the execution of the machine learning in the isolated environment to detect suspicious activity.

5. The method of claim 1, wherein an identified threat may be a potential threat or an actual threat.

6. The method of claim 1, wherein the first server which stores the scanning module is within a computing environment that includes the machine learning model.

7. A non-transitory computer readable storage medium having embodied thereon a program, the program being executable by a processor to perform a method for scanning a machine learning model for threats, the method comprising:
receiving, by a scanning module, data for a machine learning model, the scanning module stored on a first server, the data associated with model parameters and received before execution of the machine learning model;
performing, by the scanning module, a plurality of checks based on the received machine learning model data, the checks performed while the machine learning model is not executing,
the performing comprising:
determining weights and biases of the machine learning model;
determining an expected entropy for the machine learning model based on clustering of known machine learning models guided by calculated entropy;
determining, based on the weights and biases, an actual entropy for the machine learning model; and
calculating the difference between the expected entropy and the actual entropy;
identifying, by the scanning module and based on the calculated difference, whether the machine learning model includes a threat within the machine learning model based on results of the plurality of checks;
adding, by the scanning module and based on the identifying, an indicator to the machine learning model characterizing actual, potential or detected threats within the machine learning model; and
reporting the results to a remote computing device by the scanning module.

8. The non-transitory computer readable storage medium of claim 7, the method further including generating a signature based on determining that the machine learning model does not include a threat, and embedding the generated signature within the data for the machine learning model.

9. The non-transitory computer readable storage medium of claim 7, wherein the plurality of checks includes two or more of a file format check, a vulnerability check, a tampering check, and a stenography check.

10. The non-transitory computer readable storage medium of claim 7, the method further including executing the machine learning model in an isolated environment, and monitoring the execution of the machine learning in the isolated environment to detect suspicious activity.

11. The non-transitory computer readable storage medium of claim 7, wherein the first server which stores the scanning module is within a computing environment that includes the machine learning model.

12. A system for scanning a machine learning model for threats, comprising:
one or more servers including a memory and a processor; and
wherein the memory stores one or more modules which, when executed by the processor, perform operations comprising:
receiving, by a scanning module, data for a machine learning model, the data associated with model parameters and received before execution of the machine learning model,
performing, by the scanning module, a plurality of checks based on the received machine learning model data, the checks performed while the machine learning model is not executing,
the performing comprising:
determining weights and biases of the machine learning model;
determining an expected entropy for the machine learning model based on clustering of known machine learning models guided by calculated entropy;
determining, based on the weights and biases, an actual entropy for the machine learning model; and
calculating the difference between the expected entropy and the actual entropy;
identifying, by the scanning module and based on the calculated difference, whether the machine learning model includes a threat within the machine learning model based on results of the plurality of checks, and
adding, by the scanning module and based on the identifying, an indicator to the machine learning model characterizing actual, potential or detected threats within the machine learning model; and
reporting the results to a remote computing device by the scanning module.

13. The system of claim 12, the operations further comprise:
generating a signature based on determining that the machine learning model does not include a threat, and embedding the generated signature within the data for the machine learning model.

14. The system of claim 12, wherein the plurality of checks includes two or more of a file format check, a vulnerability check, a tampering check, and a stenography check.

15. The system of claim 12, the operations further comprise:
executing the machine learning model in an isolated environment, and monitoring the execution of the machine learning in the isolated environment to detect suspicious activity.

16. The method of claim 1, wherein the identifying comprises:
determining, when the machine learning model is a fine-tuned version of a base model, whether the machine learning model has a same topology architecture as the base model;
wherein:
a determination that the machine learning model has the same topology architecture as the base model indicates that there are no threats within the machine learning model; and
a determination that the machine learning model has a different topology architecture as the base model indicates that there is a threat within the machine learning model.

17. The method of claim 1, wherein the identifying comprises:
detecting whether there are dormant portions within the machine learning model which are activated upon a certain input;
wherein:
a determination that the machine learning model does not have dormant portions which are activated upon a certain input indicates that there are no threats within the machine learning model; and a determination that the machine learning model has dormant portions which are activated upon a certain input indicates that there is a threat within the machine learning model.

18. The method of claim 1, wherein the identifying comprises:

detecting whether a distribution of lower order bits within the model parameters of the machine learning model is random;

wherein:

a determination that the distribution of the lower order bits within the model parameters of the machine learning model is random indicates that there are no threats within the machine learning model; and a determination that the distribution of the lower order bits within the model parameters of the machine learning model is not random indicates that there is a threat within the machine learning model.

19. The system of claim 12, wherein the identifying comprises:

determining, when the machine learning model is a fine-tuned version of a base model, whether the machine learning model has a same topology architecture as the base model;

wherein:

a determination that the machine learning model has the same topology architecture as the base model indicates that there are no threats within the machine learning model; and a determination that the machine learning model has a different topology architecture as the base model indicates that there is a threat within the machine learning model.

20. The system of claim 12, wherein the identifying comprises:

detecting whether there are dormant portions within the machine learning model which are activated upon a certain input;

wherein:

a determination that the machine learning model does not have dormant portions which are activated upon a certain input indicates that there are no threats within the machine learning model; and a determination that the machine learning model has dormant portions which are activated upon a certain input indicates that there is a threat within the machine learning model.

21. The system of claim 12, wherein the identifying comprises:

detecting whether a distribution of lower order bits within the model parameters of the machine learning model is random;

wherein:

a determination that the distribution of the lower order bits within the model parameters of the machine learning model is random indicates that there are no threats within the machine learning model; and a determination that the distribution of the lower order bits within the model parameters of the machine learning model is not random indicates that there is a threat within the machine learning model.

* * * * *